(12) United States Patent
Sinibaldi et al.

(10) Patent No.: US 9,923,749 B2
(45) Date of Patent: Mar. 20, 2018

(54) ADAPTIVE FREQUENCY TRACKING MECHANISM FOR BURST TRANSMISSION RECEPTION

(71) Applicant: SR Technologies, Inc., Davie, FL (US)

(72) Inventors: John C. Sinibaldi, Pompano Beach, FL (US); Adam Ruan, Wellington, FL (US); Conrad C. Smith, Parkland, FL (US)

(73) Assignee: SR Technologies, Inc., Davie, FL (US)

( * ) Notice: Subject to any disclaimer, the term of this patent is extended or adjusted under 35 U.S.C. 154(b) by 118 days.

(21) Appl. No.: 15/012,342

(22) Filed: Feb. 1, 2016

(65) Prior Publication Data

US 2016/0226654 A1 Aug. 4, 2016

Related U.S. Application Data

(60) Provisional application No. 62/110,897, filed on Feb. 2, 2015.

(51) Int. Cl.
*H04L 27/26* (2006.01)
*H04W 56/00* (2009.01)

(52) U.S. Cl.
CPC ...... *H04L 27/2665* (2013.01); *H04L 27/2657* (2013.01); *H04W 56/005* (2013.01)

(58) Field of Classification Search
CPC ........ H04W 56/00–56/0095; H04L 7/00–7/10; H04L 56/008
See application file for complete search history.

(56) References Cited

U.S. PATENT DOCUMENTS

| | | | | |
|---|---|---|---|---|
| 4,847,876 A * | 7/1989 | Baumbach | ............ | H04L 7/0083 329/310 |
| 6,094,464 A * | 7/2000 | Ebringer | ................ | H04L 7/041 375/342 |
| 6,618,452 B1 * | 9/2003 | Huber | ................ | H04L 27/2607 370/512 |
| 8,255,208 B2 * | 8/2012 | You | ........................ | G10L 19/025 704/222 |
| 9,184,961 B2 * | 11/2015 | Kroeger | ................ | H04L 27/156 |
| 2006/0072586 A1 * | 4/2006 | Callaway, Jr. | ...... | H04L 27/0014 370/395.62 |
| 2006/0083319 A1 * | 4/2006 | Giannakis | ............ | H04B 1/7183 375/259 |
| 2006/0270355 A1 * | 11/2006 | Mak | ........................ | H04L 43/00 455/67.11 |
| 2010/0054379 A1 * | 3/2010 | Eymann | .............. | H04L 27/2334 375/344 |
| 2014/0241466 A1 * | 8/2014 | Cajegas, III | ........ | H04L 27/2271 375/326 |

(Continued)

*Primary Examiner* — Warner Wong
(74) *Attorney, Agent, or Firm* — Christopher & Weisberg, PA

(57) ABSTRACT

A method and wireless communication device for tracking frequencies of transmitted burst signals. The method includes receiving a burst signal, determining a quality of the burst signal and a carrier frequency of the burst signal, demodulating the burst signal based upon the determined carrier frequency, determining a frequency offset of the burst signal based on the determined carrier frequency, and when the quality of the burst signal exceeds a threshold, calculating a drift window based on the determined frequency offset.

17 Claims, 12 Drawing Sheets

(56) References Cited

U.S. PATENT DOCUMENTS

2014/0369448 A1* 12/2014 Ogoro ................. H04L 27/2665
375/340
2015/0078172 A1* 3/2015 Chowdiah ............... H04L 43/12
370/241

* cited by examiner

ADAPTIVE FREQUENCY TRACKING MECHANISM FOR BURST TRANSMISSION RECEPTION

CROSS-REFERENCE TO RELATED APPLICATION

This application is related to and claims priority to U.S. Provisional Patent Application Ser. No. 62/110,897, filed Feb. 2, 2015, entitled "ADAPTIVE FREQUENCY TRACKING MECHANISM FOR BURST TRANSMISSION RECEPTION", the entirety of which is incorporated herein by reference.

STATEMENT REGARDING FEDERALLY SPONSORED RESEARCH OR DEVELOPMENT n/a

FIELD

The present disclosure relates to a method and system for wireless communications and in particular to reception and demodulation of burst wireless transmissions.

BACKGROUND

Wireless receivers are required to align their receiver frequency clock with that of the transmitter with which they are communicating. Wireless receivers commonly use a crystal oscillator as the clock source. Variability of the frequency derived from the clock at the receiver can result in errors between the frequency transmitted and the demodulated received signal, resulting in a carrier frequency error. In addition there can also be a Doppler shift in the frequency due to the rate of change in distance between the transmitter and receiver. This frequency error can affect the received signal in several ways. One particular problem is that if the signal strength of the received signal is low. In order to account for a carrier frequency error, the detection bandwidth must be wide enough to cater for not only the bandwidth of the wanted signal, but also for the maximum possible frequency error. The level of noise at the input of a receiver is proportional to the bandwidth and hence, in order to detect a low level signal, it is desirable to keep the bandwidth to a minimum. It is common in digital communications systems to use a fixed preamble which can be used to detect the start of a transmission and for frequency correction.

In many wireless systems, time division multiplexing (TDM) is used as a method to transmit and receive signals. TDM is used primarily for digital signals where the time domain is divided into several time slots, usually of fixed durations, which are termed sub-channels. During each time slot, a data block is transmitted that is addressed to a particular station. TDM is often used in satellite based communications where the satellite communicates with a number of ground based stations. At the ground based station the reception of the transmissions from the satellite is therefore seen as a series of burst signals, coincident with one or more time slots. In such a system, the satellite is usually equipped with a very accurate time clock, but ground based stations, especially in the case of mobile stations, will tend to use a crystal oscillator reference.

Mobile stations can experience a range of signal strength conditions ranging from a clear line of sight, to one where there is no line of sight and the signal is subject to varying degrees of obstruction losses. As the signal level drops, the signal to noise ratio (SINR) decreases. Also, the effects of any co-channel interference will become more prominent. As the signal to noise and interference ratio (SNIR) drops and noise and interference become more prominent, the result is that noise spikes will occur within the receiver detection bandwidth. Even if the transmitter is sending regular signals that can be used to correct and maintain the frequency accuracy, the mobile station can be in a location or condition where it can lose the signal and hence can undergo relatively long periods with no received signal. Such an example would be when a mobile ground station is taken indoors and it loses the signal from the satellite. Indeed, in many communication satellite systems, the received satellite signal is generally low and the mobile station is generally operating under low SNIR conditions. When the signal is lost for significant periods, the relative clock drift between the ground-based station and the satellite will result in a higher SNIR to be required in order to capture the signal. A typical crystal clock reference will have an accuracy of ±1 ppm and stability over the operating temperature range of ±20 ppm. Ageing and voltage variations will also affect the absolute accuracy. After long periods of no reception, due to the device being switched off, being in a location that obstructs the transmitter or located indoors, the relative clock drift may be significant and it is usually necessary to cater for up to 1 ppm possible drift. For a satellite system that has carrier frequencies at 1.5 GHz or higher, 1 ppm represents a frequency error of 1500 Hz.

One satellite system of interest is one that meets the GMR1 specification. One example of such a satellite system is the commercial Thuraya® satellite system which operates in the L band at downlink carrier frequencies of 1525-1559 MHz. In a GMR1 satellite system there are three different categories of control channels. The broadcast control channel is a downlink channel that includes the Frequency Correction Channel (FCCH) which is intended for frequency correction, in practice, using the scheme provided by the FCCH, it requires a certain SNIR to function and it is highly desirable to improve this estimation performance.

SUMMARY

The present disclosure advantageously provides a method and wireless communication device for tracking frequencies of transmitted burst signals. In one aspect of the disclosure, the method includes receiving a burst signal, determining a quality of the burst signal and a carrier frequency of the burst signal, demodulating the burst signal based upon the determined carrier frequency, determining a frequency offset of the burst signal based on the determined carrier frequency, and when the quality of the burst signal exceeds a threshold, calculating a drift window based on the determined frequency offset.

In another aspect of the disclosure, a method of tracking frequencies of transmitted burst signals is provided. The method includes receiving a burst signal, determining a carrier frequency of the burst signal, demodulating the burst signal based upon the determined carrier frequency, determining a frequency offset of the burst signal based on the determined carrier frequency, and calculating a drift window based on the determined frequency offset.

In yet another aspect of the disclosure, a wireless communication device configured to track frequencies of transmitted burst signals is provided. The wireless communication device includes a transceiver configured to receive a burst signal, and processing circuitry including a memory and a processor, the memory in communication with the processor. The memory includes instructions that, when executed by the processor, configures the processor to determine a quality of the burst signal and a carrier frequency of the burst signal, demodulate the burst signal based upon the determined carrier frequency, determine a frequency offset of the burst signal based on the determined carrier frequency, and when the quality of the burst signal exceeds a threshold, calculate a drift window based on the determined frequency offset.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

In order to aid understanding the disclosure, the example of use with the Thuraya® satellite system is described herein, it being understood that the disclosure described herein is not limited solely to use with such a system. It is contemplated that uses in systems other than the Thuraya® satellite system can be made based on the disclosures made herein.

This disclosure describes a system and method that enables the carrier of a signal to be recovered in very low SNIR conditions and subsequent successful demodulation of the received signal in low SNIR conditions. This method is suitable for use with many digital communication systems where detection under low SNIR conditions prevail.

The Thuraya® satellite system operates in the L band at downlink carrier frequencies of 1525-1559 MHz. In a GMR1 satellite system, the signals are sent as a series of bursts. Bursts are sent in a defined time and frequency window. A multiframe is 640 ms in duration and consists of 16 TDM frames, each 40 ms in duration. Each TDM frame is divided into 24 timeslots each of 5/3 ms duration. The basic modulation is pi/4 Coherent Quadrature Phase Shift Keying (π/4 CQPSK) at the raw data rate of 46.8 kbps. CQPSK has a raw bit rate of 2 bits per symbol so the lowest symbol rate is therefore 23400 symbols per second for this example. Each timeslot consists of 78 bits and bursts with useful durations are based on 2, 3, 6, and 9 consecutive timeslots. Each burst has a guard period of 5 half symbol periods before the useful duration which centers the burst's useful duration within its timeslot(s). The logical channels may be either a traffic channel or a control channel. The traffic channels carry speech or user data and can occupy 3, 6 or 9 consecutive timeslots dependent upon the gross transmission rate. There are three different categories of control channels. One control channel is a downlink channel referred to as the Frequency Correction Channel (FCCH) which is intended for frequency correction. The FCCH is a chirp signal over 3 timeslots, 5 ms, that is transmitted every 320 ms. Another control channel is the Broadcast Control Channel (BCCH). This is a control channel from the satellite that is always active and is a burst transmission every 320 ms over 6 timeslots, or 10 ms. Note that in this example, carrier recovery may be performed on the burst signal information instead of the FCCH since bursts can be from many sources.

Figure 1:
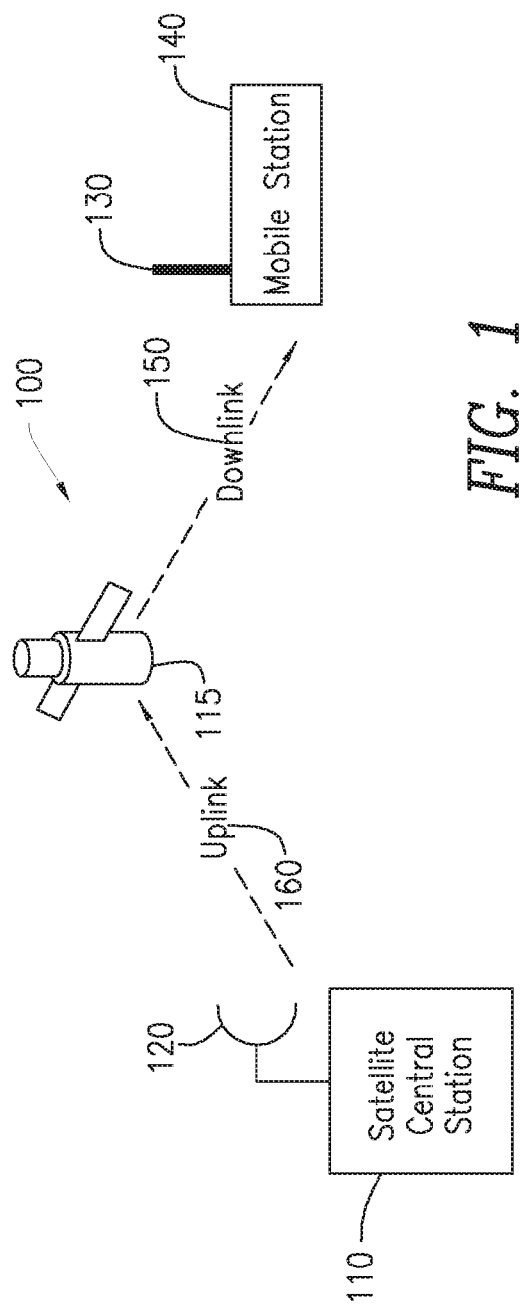
FIG. 1 is a schematic diagram of a wireless link.

Referring now to the drawing figures, where like reference designators refer to like elements, there is shown in FIG. 1 a schematic diagram of a wireless communication system 100. A central station 110 communicates with a mobile station 140 by use of their respective antennas 120 and 130, via satellite 115. The traffic is bidirectional, downlink 150 and uplink 160. Thus, uplink signals travel from mobile station 140 to satellite 115 and then to central station 110. Downlink signals travel from central station 110 to satellite 115 and to mobile station 140. In a time division multiplex scheme the central station 110 will communicate with several mobile stations using different TDM frames.

Figure 2:
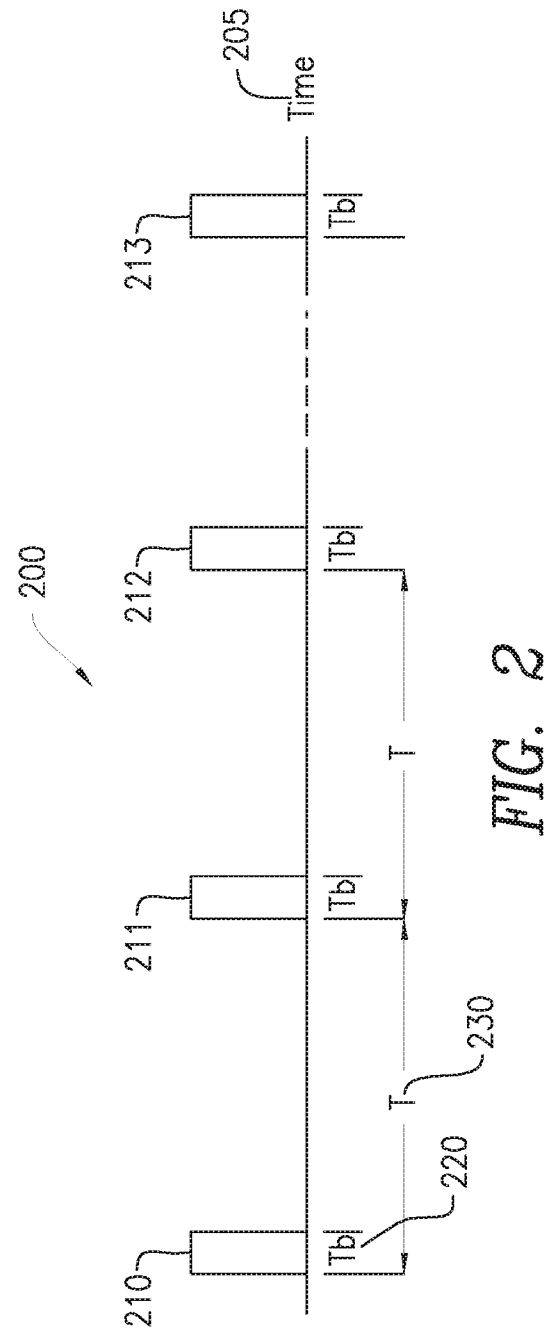
FIG. 2 is a schematic diagram of several burst signals in a Time Division Multiple Access (TDMA) frame.

FIG. 2 is a schematic diagram that represents the burst signal that is received at the mobile station 140 in FIG. 1. This shows the TDMA format. Along the time axis 205, periodic bursts are received as represented by 210, 211, 212, and 213. The bursts are Tb in duration 220, and the time between them is T, 230. For example, for the BCCH bursts used in a GMR1 satellite system, Tb 220 is 10 ms, and T 230, is 320 ms.

Figure 3:
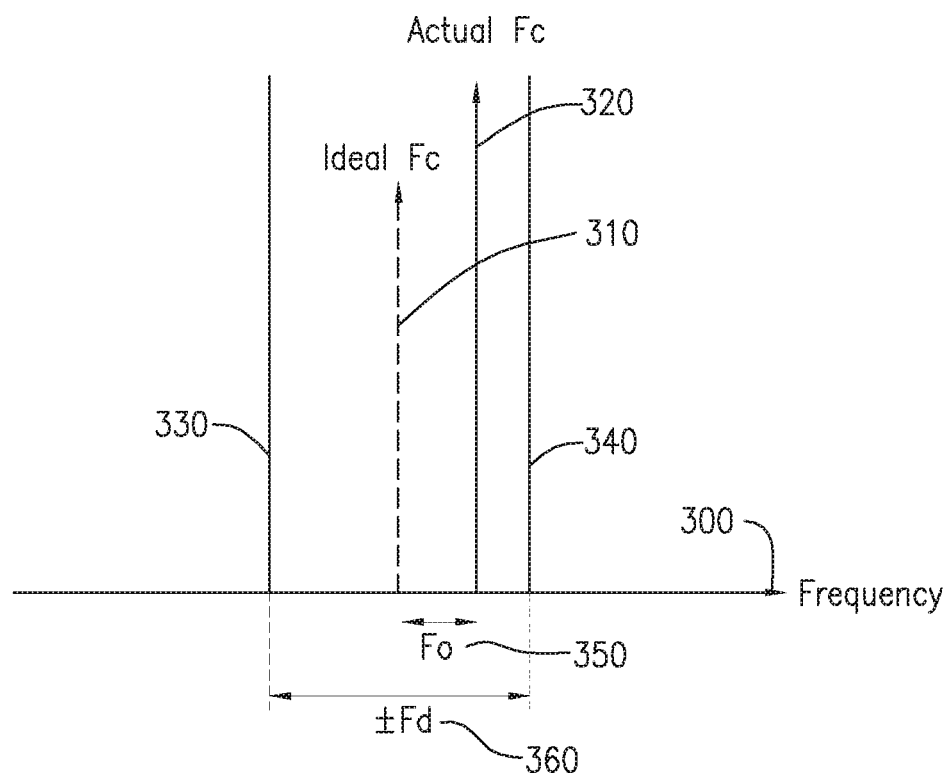
FIG. 3 is a diagram of the reception of a carrier in the frequency domain.

FIG. 3 is a diagram of the reception of a carrier in the frequency domain 300. The actual received carrier frequency carrier 320 is offset from the ideal carrier frequency 310 by Fo 350 due to differences in the clocks at the transmitter and the receiver and effects of Doppler shift. The two frequencies 320 and 330 represent the expected maximum offset ±Fd 360. The actual received carrier frequency 320 is not expected to be outside these limits; hence the maximum expected error is Fd.

In a GMR1 satellite system, π/4 CQPSK modulation is used. One of the desirable characteristics of pi/4 CQSPK is the relatively constant envelope behavior that allows the use of a saturated amplifier. In this modulation, the Quadrature Phase Shift Keying (QPSK) signal is rotated 45 degrees every symbol and this adds a modulation factor of the symbol rate divided by 8. For example, for a GMR1 satellite system, the symbol rate is 23400 symbols per second, and hence this rotation rate is 23400/8=2925 Hz. The power spectrum of π/4 CQPSK modulation is a $sinc^2$ shape and therefore there is no distinct carrier frequency or peak frequency as such. If, however, the complex signal is squared at least one time, i.e., twice, raised to the power of four, this modulation appears as two peak frequencies separated by 2925 Hz equally spaced about the center carrier frequency. The QPSK constellation is rotated by 45° every symbol and after raising the complex signal to the $4^{th}$ power, the constellation becomes BPSK. After the signal is raised to the $4^{th}$ power, the separation of the frequency peaks can be shown to be the symbol rate divided by two. Note that a complex signal is one that contains both a real component and an imaginary component.

Figure 4:
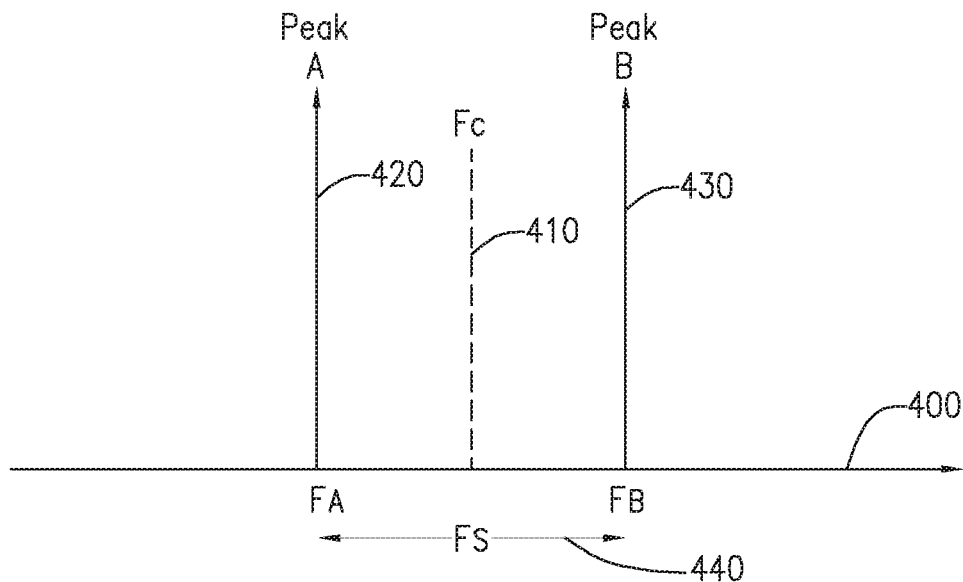
FIG. 4 is a diagram showing the two peaks after signal conditioning.

FIG. 4 is a diagram on the frequency axis 400, showing the two peaks, A, 420 at frequency $F_A$, and B, 430, at frequency $F_B$, separated in frequency by Fs 440 and equally spaced about the carrier frequency Fc 410. In the example of a GMR1 satellite system, Fs 440 will be 11700 Hz after signal conditioning where the signal is raised to the $4^{th}$ power.

Figure 5:
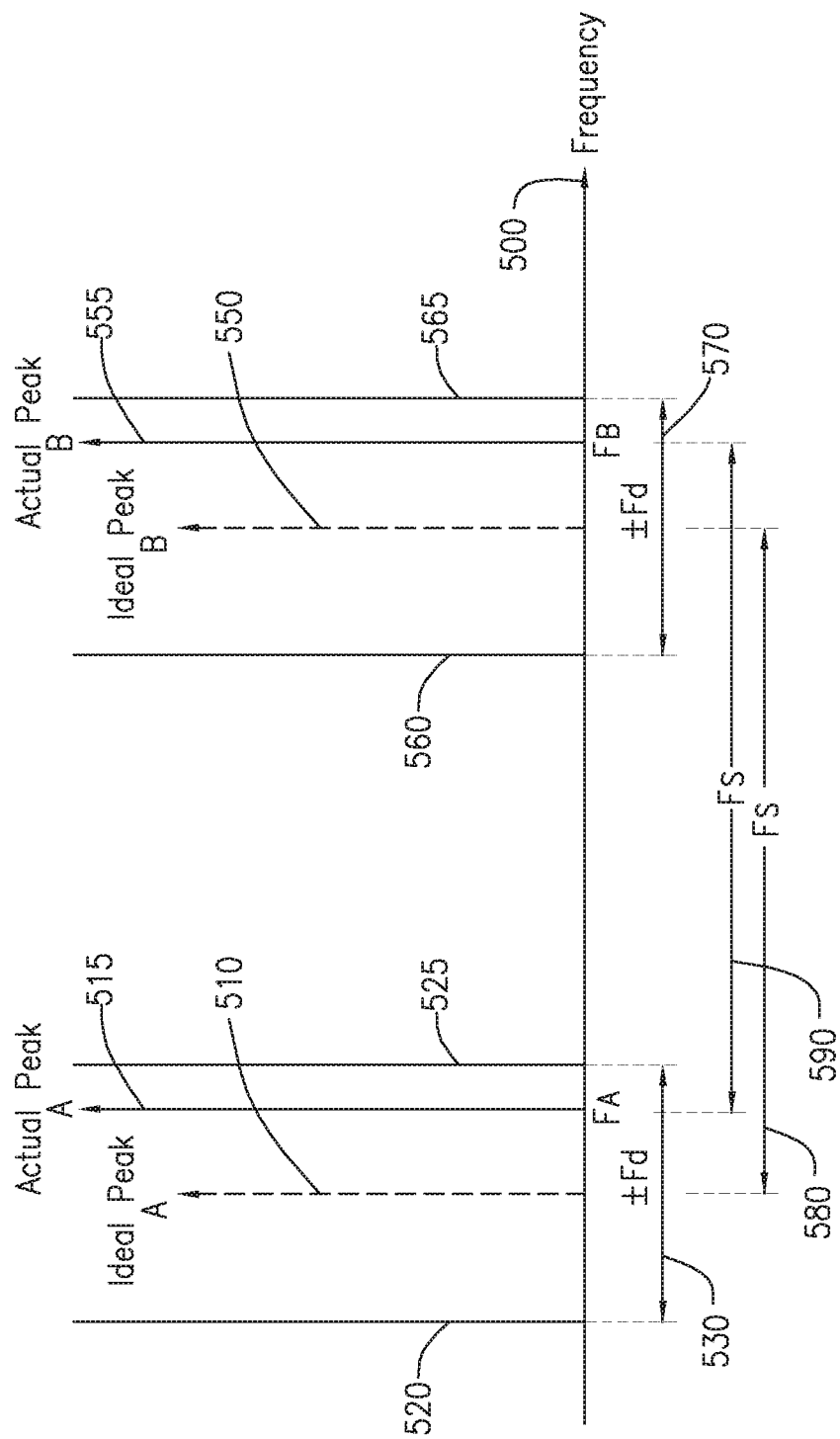
FIG. 5 is a diagram showing the two peak frequencies when there is a drift between the transmitter and receiver clocks.

FIG. 5 is a diagram on the frequency axis 500, showing the two peak frequencies described in FIG. 4 but when there is a drift between the transmitter and receiver clocks. If the transmitter and receiver clocks were perfectly aligned, the two peaks, A 510 and B 550 would be separated by a frequency equal to Fs, 580. The two actual peaks, A 515 at frequency $F_A$ and B 555 at frequency $F_B$, are also separated by a frequency of Fs, 590. Peak A, 515 is offset from the ideal position 510, but is within the maximum expected offset represented by ±Fd 530 which is the maximum expected frequency difference between the two extreme frequencies, 520 and 525. Similarly Peak B, 555 is offset from the ideal position 550, but is within the maximum expected offset represented by ±Fd 530 which is the frequency difference between the two extreme frequencies, 560 and 565. After signal conditioning, taking the square of the complex input signal at least once, two peak frequencies result and in the example of a GMR1 satellite system these will be spaced by 11700 Hz, 580 or 590. The actual frequency of each of the peaks, 515 and 555, however, may vary from the center frequencies 510 and 550 due to relative drift of the transmitter and receiver clocks.

Figure 6:
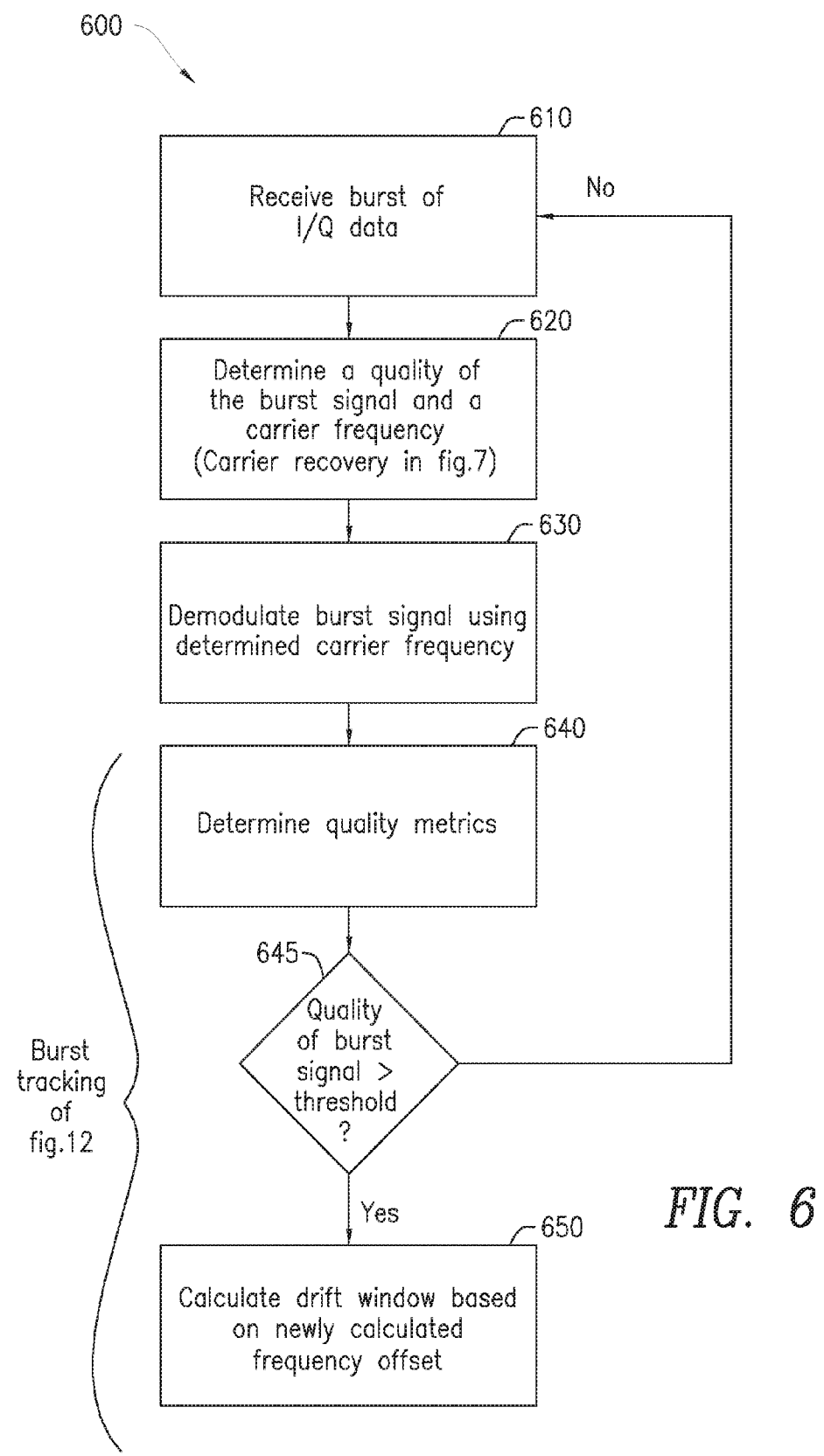
FIG. 6 is a flowchart for burst reception according to an embodiment of the present disclosure.

FIG. 6 illustrates an embodiment of an exemplary process 600 incorporating the principles of the present disclosure. The process 600 may be performed by hardware components, software, or a combination of hardware and software. The steps shown in FIG. 6 may be incorporated in any wireless communication device in wireless communication system 100 such as mobile station 140. A new block of inphase and quadrature (I/Q) data is received at block 610 and the quality of the burst signal and a carrier frequency is determined at block 620, which is explained in further detail below and illustrated in FIG. 7. The burst signal is then demodulated using the determined carrier frequency at block 630. Demodulation may be performed using well known methods such as a Costas Loop. Additional quality metrics can be derived from the demodulated signal at block 640. If the quality of the burst signal exceeds a threshold, determined by block 645, then a new drift window calculated based on the frequency offset Fo, determined by block 650. The carrier frequency will vary slightly over time so the windows will drift up or down the frequency axis. If the quality of the burst signal does not exceed the threshold, then another burst of data is received at block 610. Steps 640, 645 and 650 relate to burst tracking, discussed below in further detail and illustrated in FIG. 12.

Figure 7:
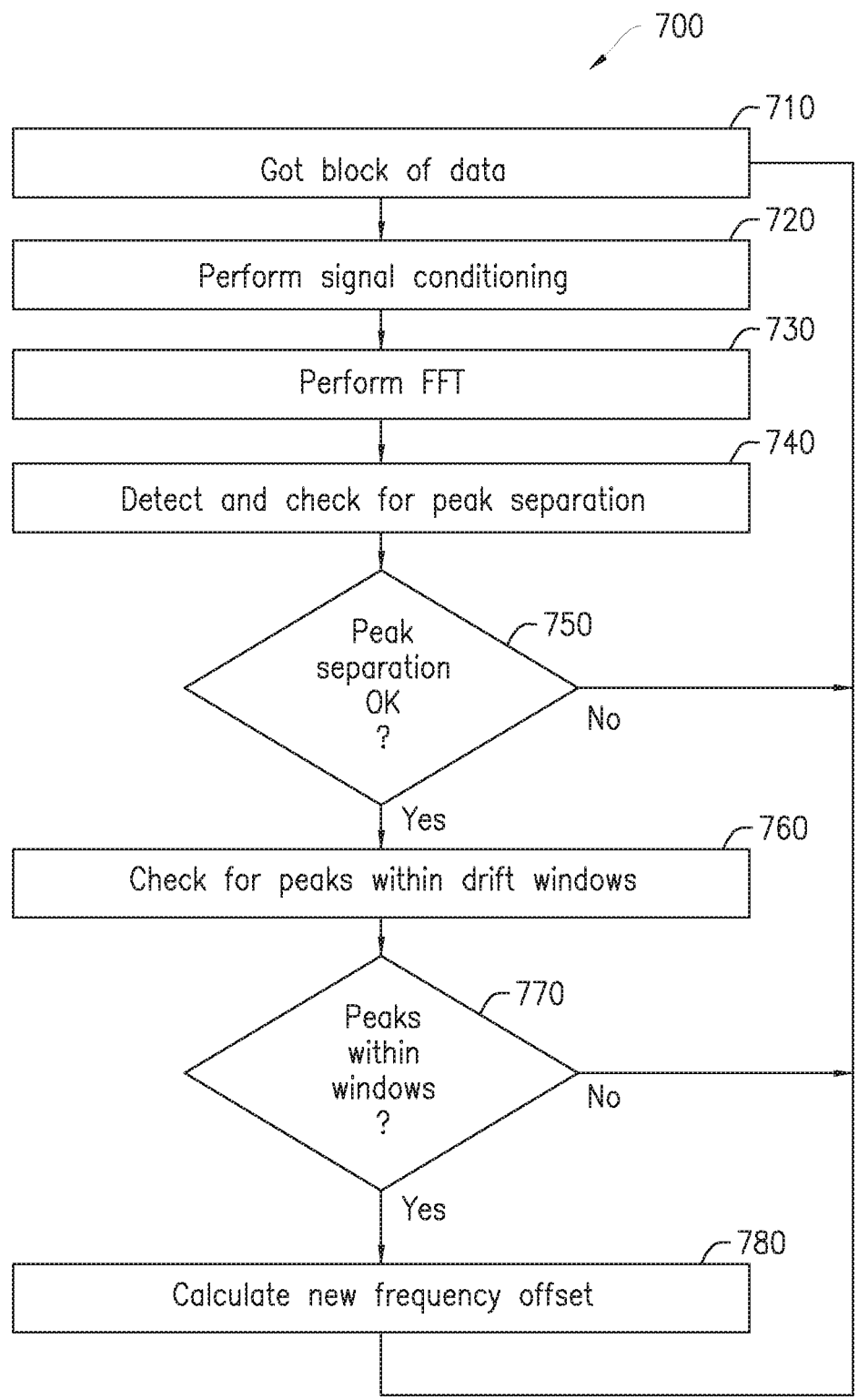
FIG. 7 is a flowchart of the basic steps for carrier recovery.
Figure 11:
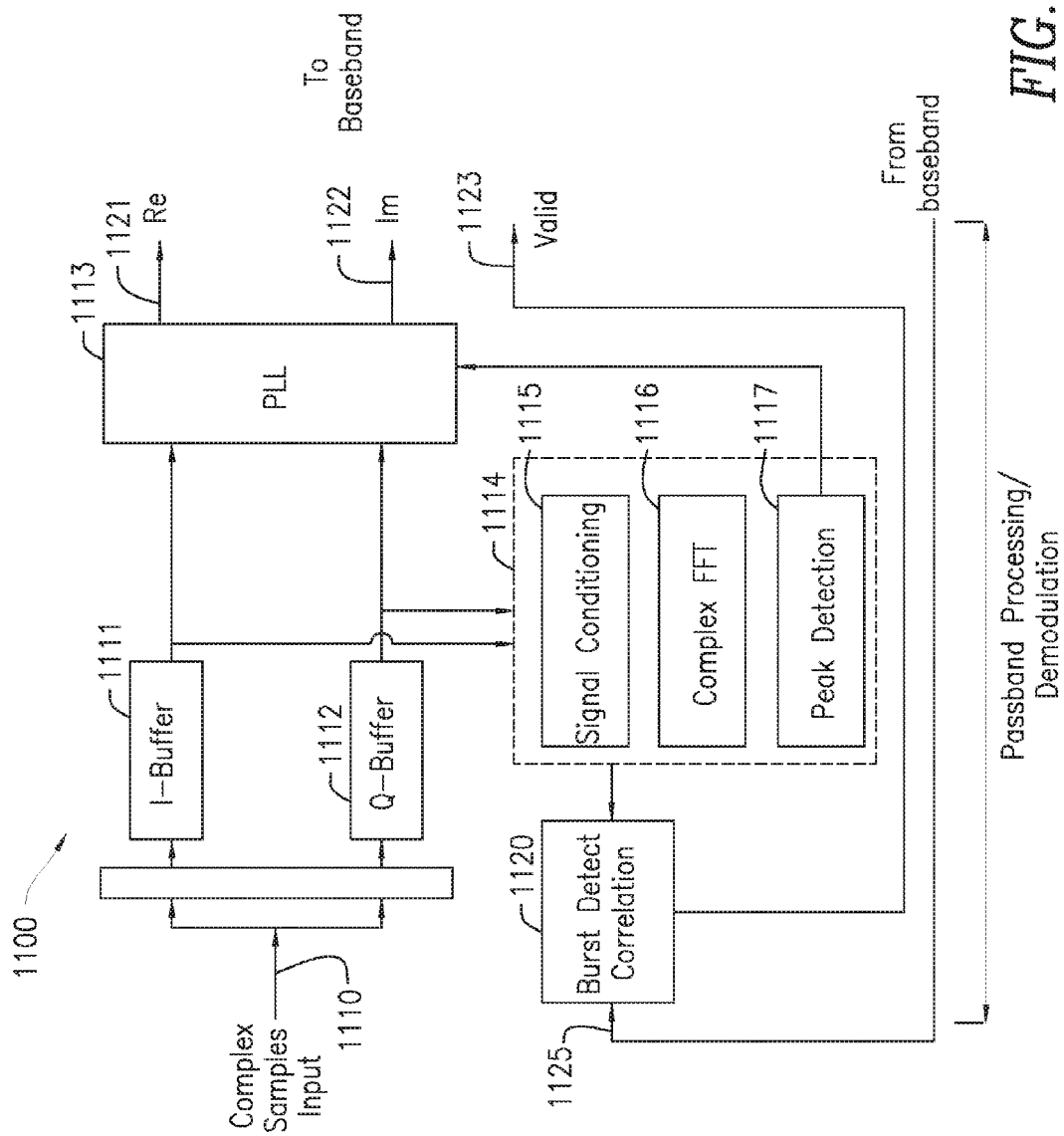
FIG. 11 is a schematic block diagram of the passband processing and demodulation block.

FIG. 7 is a flowchart 700 of the basic steps for carrier recovery. The process 700 may be performed by hardware components, software, or a combination of hardware and software. FIG. 11, discussed in detail below, illustrates hardware components that may be used, in one embodiment, to perform the steps illustrated in FIGS. 6 and 7. The process shown in FIG. 7 includes finding and checking the two peaks as described in FIG. 5 and calculating the correct carrier frequency value to be used to demodulate the burst signal. In block 710, the block of data is obtained. This is the complex sample block of the signal in the time domain. In block 720, the signal is conditioned by squaring the complex input signal at least once. In block 730, a fast Fourier transform is carried out to transform the input signal from the time domain into the frequency domain. In the example of a GMR1 satellite system, for a valid signal, there should be two peaks spaced by 11700 Hz, 580 or 590 in FIG. 5. For example, take the case where the largest expected drift is ±1500 Hz, which corresponds to about ±1 ppm for the Thuraya® satellite system. Using a bin size of about 57 Hz, then ±1500 Hz is represented by ±26 bins. The results are that, for a valid signal, there should be two peaks separated by a fixed number of bins, dependent upon the Fast Fourier Transform (FFT) size. In one embodiment, the number of bins is not fixed, but can be vary iteratively. For example with FFT sizes of 512, 1024 and 2048 the number of bins separating the two peaks is 52, 104 and 208 respectively. The higher the number of FFT bins the better the accuracy. In block 740, the results of the FFT are examined and in block 750 it is determined if there are two peaks separated by the correct number of bins and if so, then in block 760 the actual frequencies are examined and in block 770 they are checked to see if they are within the drift window. If the two peaks have the correct separation and are within the drift window then these can be assumed to be the correct peaks and a valid π/4 CQPSK burst will have been identified. In block 780, the correct frequency of the carrier is determined. The carrier frequency is a frequency midway between the two peaks and this new carrier frequency is then used as the new frequency offset and the new drift window is then based on it. When the two peak frequencies are separated by a predetermined amount and are within the drift window, the carrier frequency is determined to be derived from a point midway between the two peak frequencies. If the peak separation is not correct then in block 750 the flow returns to block 710 and no new calculation is made for the carrier frequency for the next burst or block of data. Similarly, if in block 770 the peaks are not within the drift windows, then the flow returns to block 710. In both cases for blocks 750 and 770, if the check result is negative, then the existing frequency offset is maintained, i.e., the frequency is reused. Each time a new frequency offset is calculated then this value is used for the current burst. If in block 750 or 770 the checks were not successful then the existing frequency offset is kept and used for the current burst.

Figure 8:
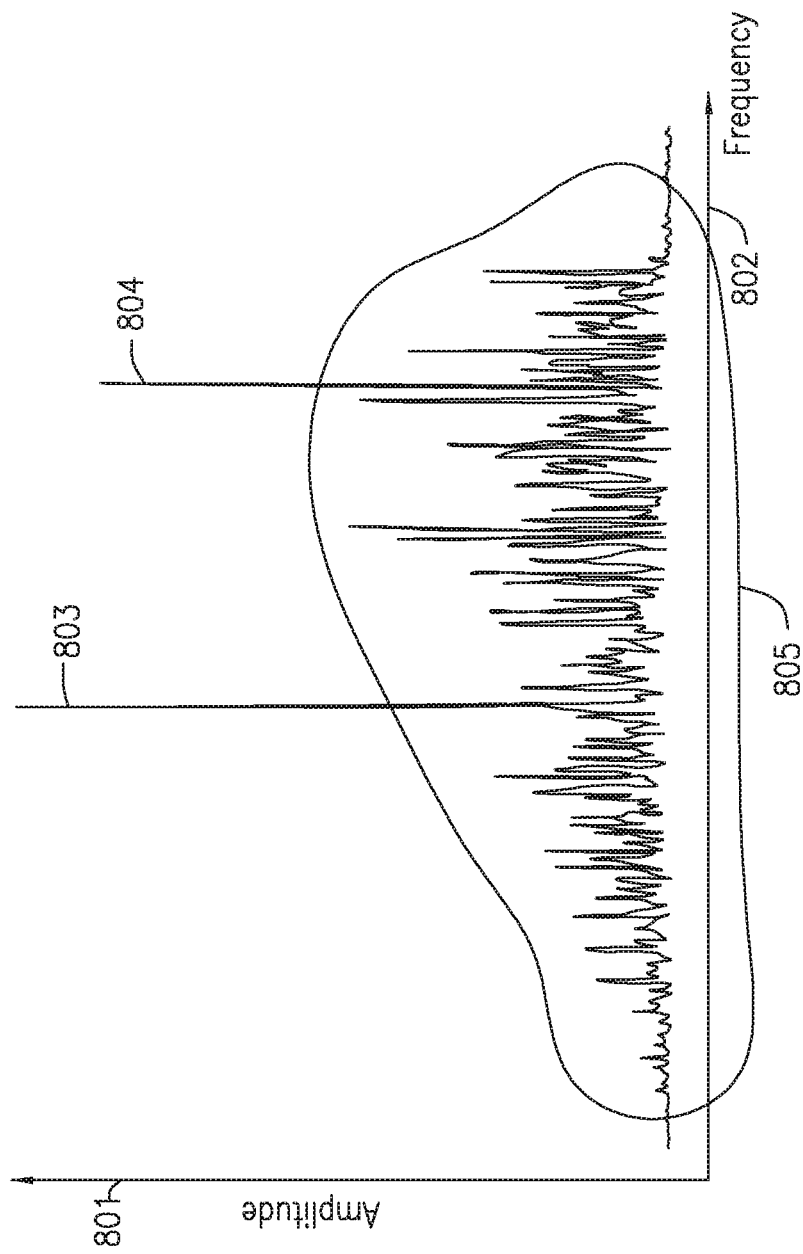
FIG. 8 is a diagram depicting one example of the frequency spectra of bursts after signal conditioning.
Figure 9:
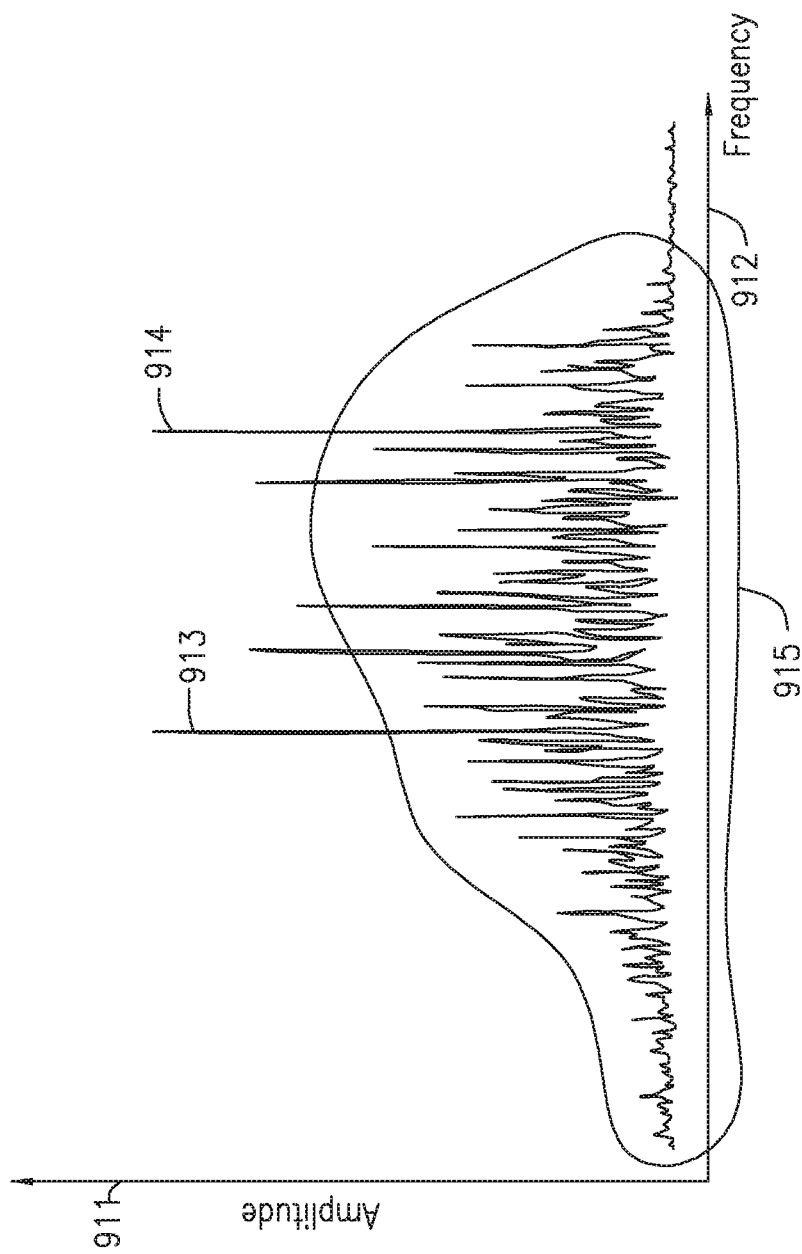
FIG. 9 is a diagram depicting another example of the frequency spectra of bursts after signal conditioning.
Figure 10:
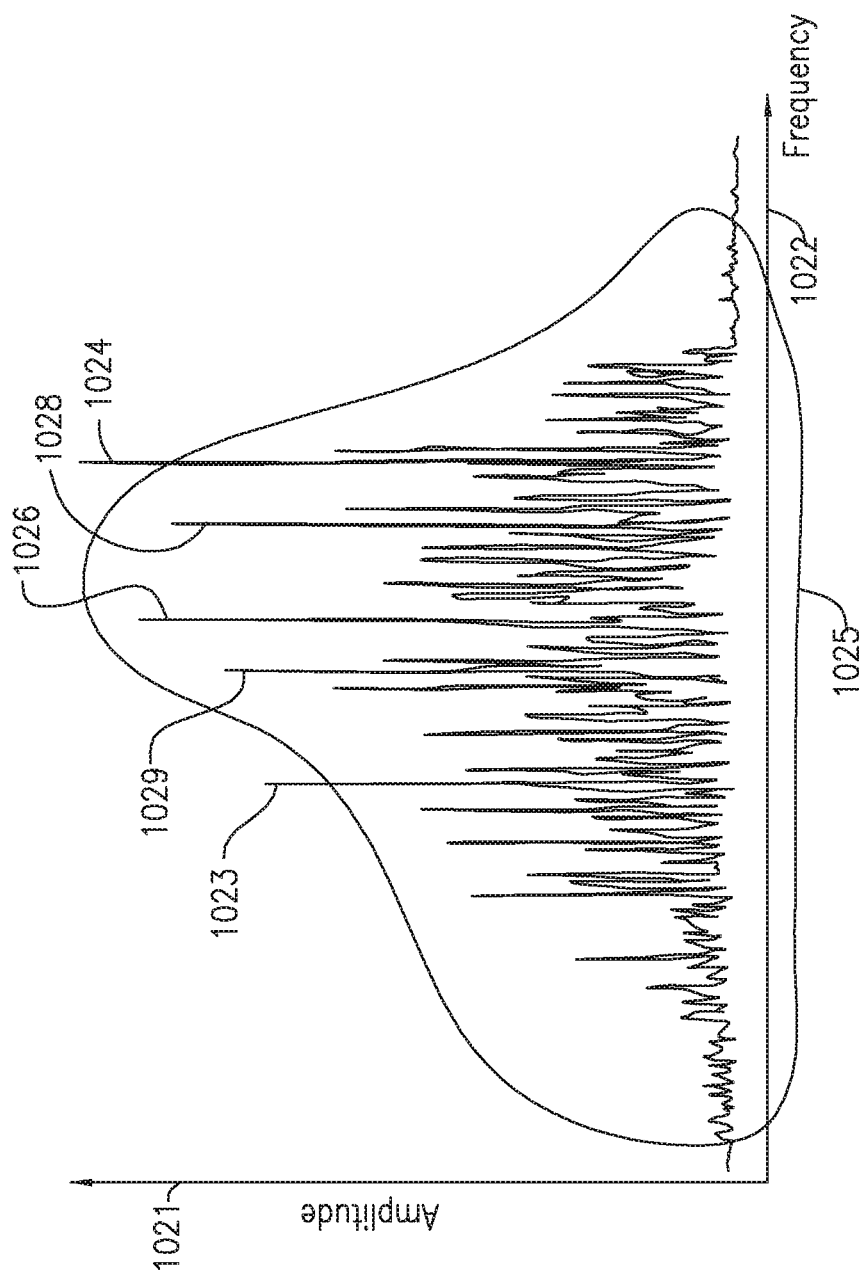
FIG. 10 is a diagram depicting yet another example of the frequency spectra of bursts after signal conditioning.

FIGS. 8-10 show that the spectra that results after signal conditioning has been carried on a various input bursts. In FIG. 8, the vertical axis 801 is amplitude and the horizontal axis 802 is frequency. After signal conditioning of the particular burst depicted, two distinct peaks, 803 and 804, are the result. The other peaks 805 are noise. In the burst depicted in FIG. 8, the two peaks 803 and 804 are separated by the correct frequency, and also are within the maximum offset window as described in FIG. 5. This particular burst was successfully demodulated using the carrier frequency as determined by the methodology of this disclosure.

In FIG. 9, the vertical axis 911 is amplitude and the horizontal axis 912 is frequency. After signal conditioning of the particular burst depicted, two distinct peaks 913 and 914, are the result. The other peaks 915 are noise and for this particular burst, the noise components 915 are higher than the noise components 805 that resulted for the burst depicted in in FIG. 8. Even with this higher noise after signal conditioning for the burst depicted in FIG. 9, because the two peaks 813 and 814 are separated by the correct frequency, and also are within the maximum offset window, as described in FIG. 5, this particular burst shown in FIG. 9 was successfully demodulated using the carrier frequency as determined by the methodology of this disclosure.

In FIG. 10, the vertical axis 1021 is amplitude and the horizontal axis 1022 is frequency. After signal conditioning of the particular burst depicted, two peaks 1023 and 1024 are the result, but it should be noted that these are not the two largest peaks present. The noise components 1025 contain three noise peaks 1026, 1028 and 1029 that are all greater than the peak 1023. Therefore these results are not used and the carrier frequency is reused from the previously successful decoded burst. This particular burst shown in FIG. 10 was successfully demodulated using the carrier frequency as determined by the methodology of this disclosure. It should be noted that the burst depicted in FIG. 10 was not successfully demodulated when the methodology as described in this disclosure was not used.

If the modulation method described herein does not result in dual peaks (described above), the single peak embodiment shown in FIG. 3 may be used. In this instance, instead of considering the separation between peaks, i.e., "peak separation=N", other criteria may be used, for example, requiring that all other peaks must be less than a certain percentage (e.g., 75%) in magnitude of the detected (largest) peak. Thus, in one embodiment, a peak frequency of the conditioned burst signal is determined, although in other embodiments, the signal need not be conditioned. When the peak frequency exceeds other frequencies by a predetermined amount, the peak frequency is determined to be a valid representation of the carrier frequency.

FIG. 11 is a schematic block diagram of the passband processing and demodulation block 1100 of an example wireless receiver constructed according to the principles of the present disclosure. In one embodiment, the wireless receiver and demodulation block 1100 are part of the mobile station 140. However, the disclosure is not limited solely to incorporation with the mobile station 140. It is contemplated that the wireless receiver and the demodulation block can be part of other elements, including the satellite central station 110 or a handheld device. The complex input signal samples 1110 are inputted to the I and Q buffers 1111 and 1112, respectively. The outputs from the buffers are inputted to the phase lock loop (PLL) block 1113. Typically, the PLL would take the form of a Costas Loop which is a well-documented design used to demodulate a phase modulated signal and is beyond the scope of this disclosure. The outputs from the buffers are also inputted to the signal conditioning and peak detection block 1114. In one embodiment, block 1114 could be, for example, a digital signal processor (DSP). In one embodiment, block 1114 includes three blocks, namely signal conditioning block 1115, complex FFT block 1116 and peak detection block 1117. Signal conditioning block 1115 performs the two times squaring of the complex time signal as described in FIG. 7 block 720. In addition, there are scaling operations performed to counter the effect of squaring. The complex FFT block 1116 carries out the FFT conversion, as described in FIG. 7 block 730, and places the frequency components into bins. Peak detection block 1117 performs the detection of the peaks as described in FIG. 7 block 740. Peak detection block 1117 also determines one measure of the quality of the burst signal before modulation based upon the quality of the FFT. The output from the peak detection block 1117 is the carrier frequency to be used for the demodulation of the burst signal and this is inputted to the PLL block 1113. The outputs of the PLL block 1113 are the real and imaginary signals 1121 and 1122, respectively that are sent to the baseband circuitry. The burst detection correlation block 1120 examines the signal from the signal conditioning block 1115 and peak detection block 1117 for quality and noise conditions. Input 1125 from the baseband is also inputted to block 1120 and supplies information on the decoded signal which can be used to determine if the signal burst is valid. This could also be interpreted as quality information after the burst is demodulated. Such quality information could mean that the cyclic redundancy check (CRC) was valid or could represent the quality of the signal constellation after demodulation. Block 1120 determines if a burst signal is present and it outputs a validity signal 1123 that informs the baseband if a valid signal is present.

As discussed above, in one embodiment, block 1114 could be a digital signal processor (DSP). It is contemplated that the other elements shown in FIG. 11 can be configured using processing circuitry such as a processor and memory such as that shown in FIG. 15 and discussed below. For example, the I and Q buffers 1111 and 1112, can be implemented using memory (such as the memory 1522 in FIG. 15), and the memory can also store instructions, which when executed by the processor (such as the processor 1521 in FIG. 15), configure the processor to perform the burst detect correlation 1120 functions. Similarly, block 1114 could be implemented using the processing circuitry of a Field Programmable Gate Array (FPGA) rather than as a DSP.

Figure 12:
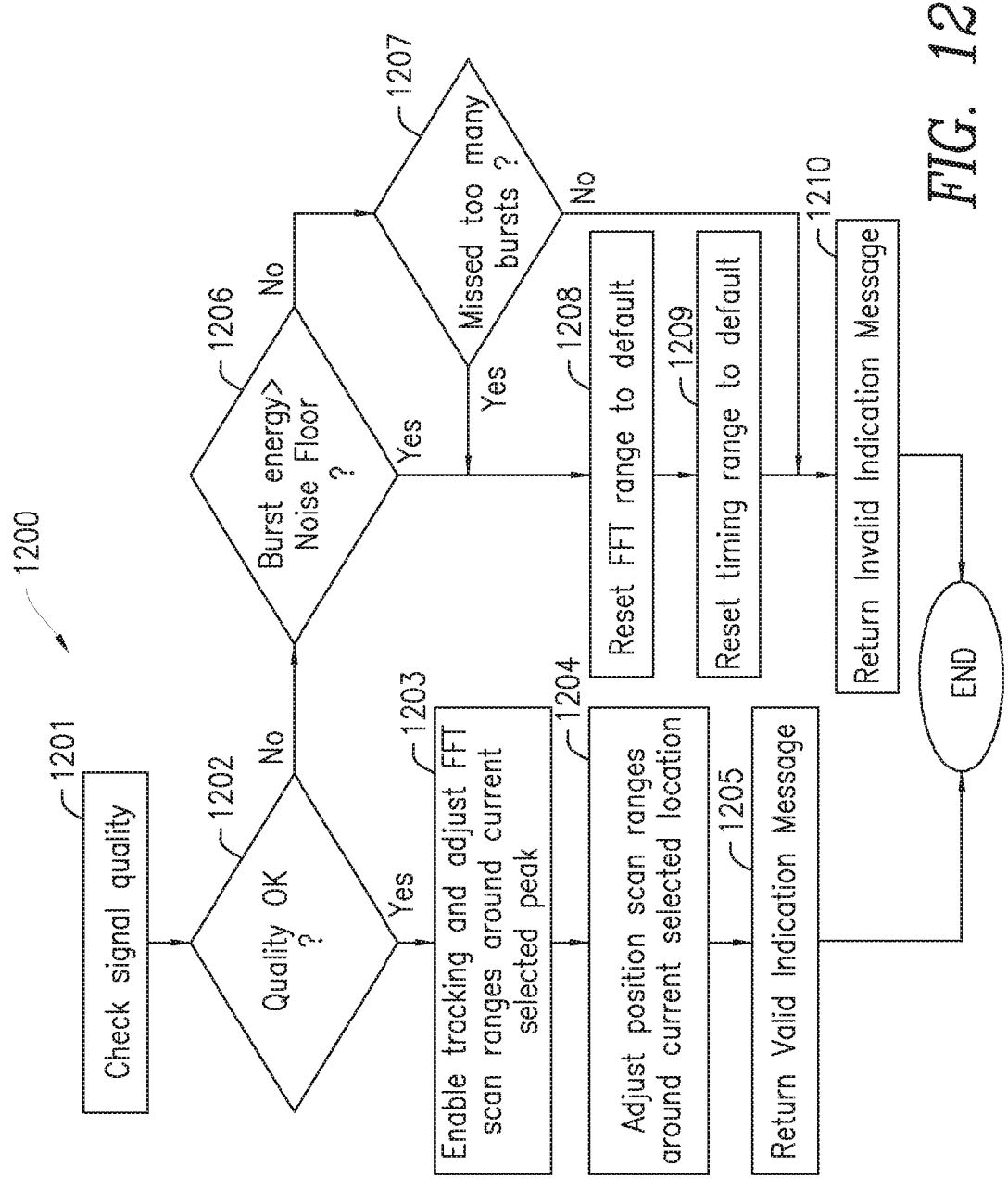
FIG. 12 is flow diagram of an example of the method used within the burst detect correlation block.

FIG. 12 is flow diagram 1200 of an example of the method used within the burst detect correlation block 1120 of FIG. 11. In block 1201, the quality of the signal is checked. This quality check may include evaluation of Hamming error, SQI, etc., obtained from the baseband and other signal quality parameters. Block 1202 checks that the signal quality is acceptable and if so tracking is enabled and the FFT scan ranges are adjusted, in block 1203, to align with the current detected peaks, i.e., "the window is closed." For each successful reception of the burst, the center of the drift window, described in FIGS. 5, 570 and 530, is re-aligned with the carrier frequency corresponding to this particular burst. In block 1204, the position scan range is adjusted to be around the current selected location. Block 1204 can adjust for any time drift in the burst signal and can correct the timing window so as to align with the actual reception of the burst. Block 1205 outputs a message indicating that the received signal burst is valid to the baseband. If, in block 1202, it is determined that the quality of the signal is not acceptable, i.e., there is something wrong with the received burst signal, then a check is made, in block 1206, to determine if the burst energy is greater than the noise floor energy. If, in block 1206 it is determined that the noise level is higher, then in block 1207 a check is carried out to see if a particular number of successive bursts have been missed. This can be achieved by checking that a certain time has elapsed with no reception of signals. If it determined that too many bursts have been missed then, in block 1208, the carrier frequency scan ranges of the burst signals are reset to their defaults and in block 1209, the timing is reset to its default values, i.e., "the window is open." If at block 1206 it is determined that the burst energy is higher than the noise floor then this is indicative of a signal burst being detected but that the data was not satisfactorily received. In this case, the FFT and the timing ranges are reset to default in blocks 1208 and 1209 respectively, i.e., "the window is opened,"

and an invalid message is indicted in block 1210. In this case the signal has effectively been lost and therefore the current values for the center frequency and the drift windows are invalid. The default values may be to use wider drift windows, 530 and 570 in FIG. 5, or indeed to simply check for two distinct frequency peaks that have the correct separation and only when a successful acquisition is achieved, reset the drift windows in order to improve the sensitivity even further.

If, in block 1207, it is determined that there has not been sufficient missed bursts to warrant resetting the FFT and timing ranges to the defaults, then the flow jumps to block 1210 and an invalid message is indicated without resetting the FFT and timing ranges to the default values, i.e., "the window remains closed." Note that block 1207 may be implemented by using a frame counter. For example, the FFT and timing ranges could be reset to their respective default values if four or five bursts are missed. In one embodiment, 25 frames of data could be missed before resetting the FFT and timing ranges. If each frame holds one burst for a channel, and if the frames are 40 msec. long, this amounts to one second of missed bursts. Then, if no valid burst is detected for one second worth of frames, the drift windows, 530 and 570 of FIG. 5, would be set to the wider default settings, i.e., the window will be opened. Note that when the process of block 1207 is performed, the process of deep fading may be considered. In this instance, during a mobile wireless call, the signal will drop put for short periods due to multipath interference. Thus, the time without a valid burst could be larger than the typical drop put period.

Figure 13:
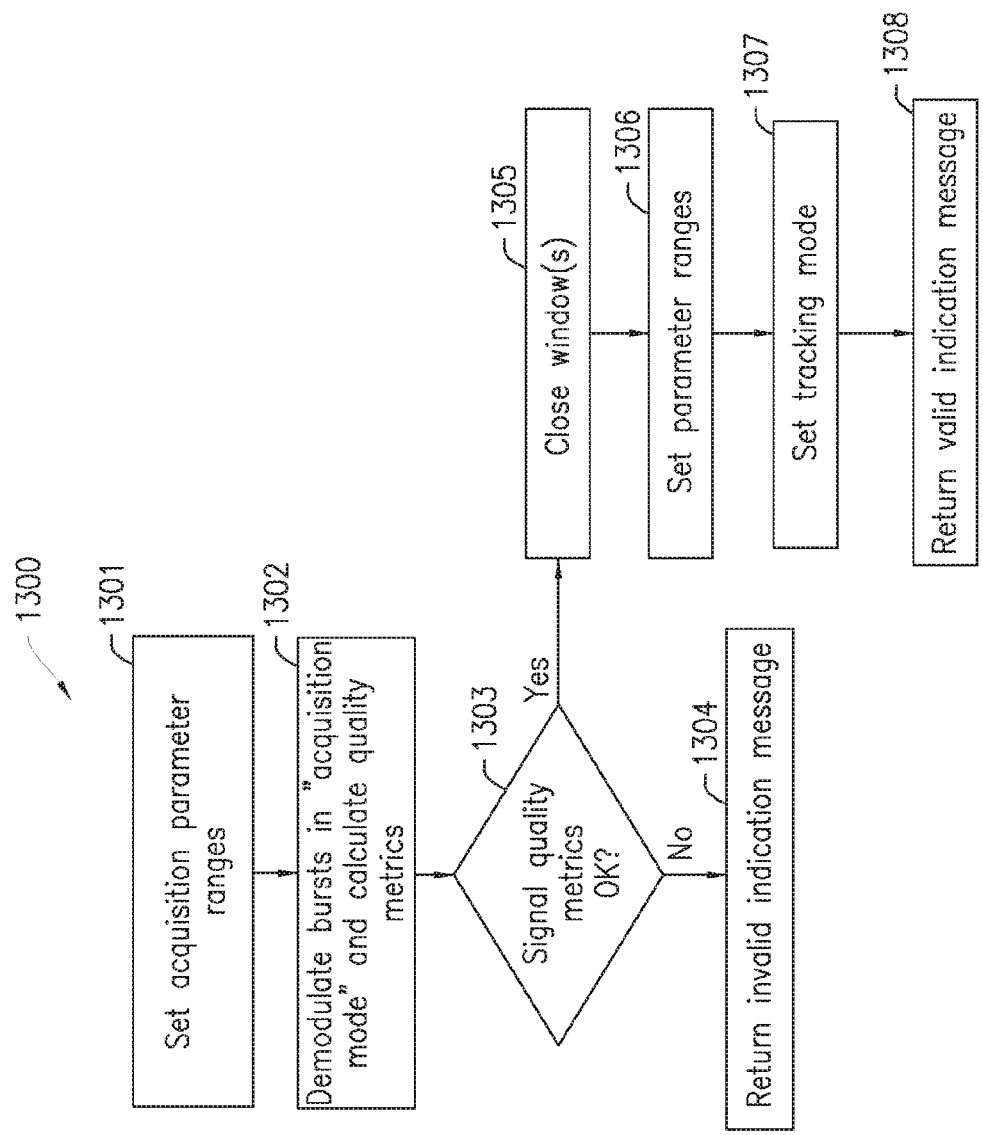
FIG. 13 is a flow diagram of detection in acquisition mode.

FIG. 13 is a flow diagram of a flow process 1300 for a further embodiment of the disclosure that allows for any number of parameters in addition to the frequency and position previously described to be used to determine the successful acquisition of a burst. The flow process 1300 represents the demodulation of the bursts while in acquisition mode. In block 1301 a number of parameters are chosen and their corresponding ranges. In block 1302 the received burst is demodulated and the quality of the demodulated burst assessed by calculating or determining the parameters chosen in block 1301. Block 1303 checks the demodulated burst signal quality metrics against the required ranges set in block 1301 and if successful, in block 1305, the frequency and timing windows, as described previously, are set. In block 1306 the parameter ranges originally set in block 1301 may be reset or centered or new parameters may be set for subsequent bursts when the method returns to acquisition mode. In block 1307, as it has been determined that a successful burst has been acquired and tracking mode has been implemented, in block 1308 a valid burst indication is returned and then subsequent bursts will be received in tracking mode, as will be described in FIG. 14. If, at block 1303, the demodulated burst signal quality against the required ranges set in block 1301 is not successful, then an invalid burst indication is returned and the detection remains in acquisition mode.

Figures 14, 15:
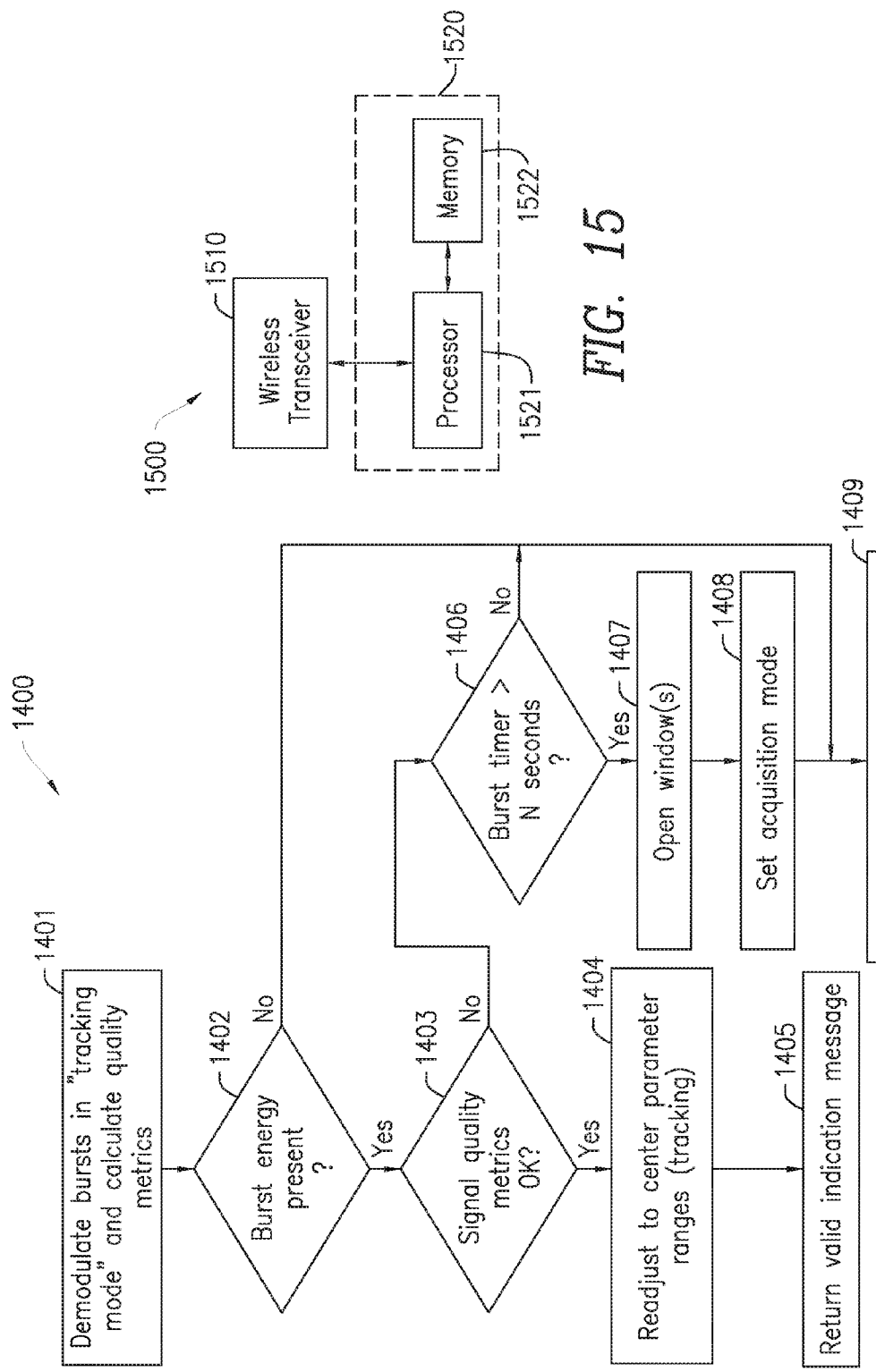
FIG. 14 is a flow diagram of detection in tracking mode.
FIG. 15 illustrates a wireless communication device.

FIG. 14 is a flow process 1400 that represents the embodiment when the detection is in tracking mode as a result of the acquisition mode, described in FIG. 13, having determined that the burst was successful. In block 1401 the burst is demodulated and the quality metrics are calculated. In block 1402 it is determined if the burst signal energy is above a certain level. This block is similar to block 1206 in FIG. 12. If the energy is not sufficient, then it is determined that the SNR is too low and therefore an invalid burst message is returned in block 1409. As the level of the received burst was too low, the detection will remain in tracking mode and no changes to any parameters are made. This prevents opening the window from a block of noise where no burst was sent. If, in block 1402, the burst signal energy is above the required threshold, then in block 1403 the signal quality metrics are checked. If, in block 1403, the signal quality is determined to be sufficient, then in block 1404 the parameter ranges, e.g., the position or frequency of the burst, are readjusted so as to align with the received parameters for this burst, a valid burst indication message is returned in block 1405 and the detection remains in tracking mode. If in block 1403 the signal quality measurement fails, then in block 1406 a check is made of the elapsed time since a successful burst. If this time is exceeded then in block 1407 the windows for the parameters are opened up, the mode is set to acquisition mode in block 1408 and an invalid burst indication message is returned at block 1409. Note that it may be desirable to have the windows opened and acquisition mode entered as soon as the measurement fails once so that this elapsed time is effectively zero. The next bursts are then received in acquisition mode as described in FIG. 13. If in block 1406, the time elapsed since a successful burst has not exceeded the preset time, then in block 1409 an invalid burst indication is returned but the detection remains in tracking mode.

Thus, in one embodiment of the present disclosure, a method of tracking frequencies of transmitted burst signals is provided. The method includes receiving a burst signal, determining a quality of the burst signal and a carrier frequency of the burst signal, demodulating the burst signal based upon the determined carrier frequency, determining a frequency offset of the burst signal based on the determined carrier frequency, and when the quality of the burst signal exceeds a threshold, calculating a drift window based on the determined frequency offset.

In another embodiment of the present disclosure, a method of tracking frequencies of transmitted burst signals is provided. The method includes receiving a burst signal, determining a carrier frequency of the burst signal, demodulating the burst signal based upon the determined carrier frequency, determining a frequency offset of the burst signal based on the determined carrier frequency, and calculating a drift window based on the determined frequency offset. If the determined carrier frequency is not within a carrier range, the previously calculated carrier frequency resulting from a valid burst is used.

FIG. 15 illustrates a wireless communication device 1500 according to an embodiment of the disclosure. The wireless communication device may be any device capable of wirelessly receiving and/or wirelessly transmitting signals and can execute any of the methods illustrated in this disclosure. It may be a satellite central station 110 or a wireless or ground based mobile station 140. The wireless communication device 1500 includes a wireless transceiver 1510, and processing circuitry 1520. The processing circuitry 1520 includes a processor 1521 and a memory 1522 in operative communication with the processor 1521. According to an embodiment of the disclosure, the wireless transceiver 1510 is arranged to receive signals and the processor 1521 is arranged to calculate the input signal's attribute and determine an attribute of a carrier frequency detection scheme.

In one embodiment, the wireless communication device 1500, such as the mobile station 140, is configured to track frequencies of transmitted burst signals. Wireless communication device 1500 includes transceiver 1510 configured to receive a burst signal and processing circuitry 1520 including memory 1522 and processor 1521, the memory 1522 in communication with the processor 1521, the memory 1522 having instructions that, when executed by the processor 1521, configure the processor 1521 to determine a quality of the burst signal and a carrier frequency of the burst signal, demodulate the burst signal based upon the determined carrier frequency, determine a frequency offset of the burst signal based on the determined carrier frequency; and, when the quality of the burst signal exceeds a threshold, calculate a drift window based on the determined frequency offset. In one embodiment, the processing circuitry 1520 can include the DSP 1114 and/or provide the functions described herein as performed by the DSP 1114. In another embodiment, the DSP 1114 includes some or all of the memory 1522 and the processor 1521.

Although the above description uses a GMR1 satellite system as an example, in no way should this be construed as limiting the disclosure to that system. The present disclosure, as described, can be applied to any wireless communication system where TDM and bursts are used. Note that in the case of a streaming signal, where instead of burst of information there is a continuous stream of signal, the signal may be read in contiguous blocks of fixed size. The same process can be applied to the blocks of the streaming data.

While the above description contains many specifics, these should not be construed as limitations on the scope, but rather as an exemplification of several embodiments thereof. It is of course not possible to describe every conceivable combination of components and methodologies for the purposes of describing this disclosure and one of ordinary skill in the art may recognize that many further combinations and permutations of the various embodiments are possible, including, for examples: the drift windows and time windows, the size and number of bins used in the FFT, the separation of the peaks after signal conditioning, the parameters used for signal quality determination. Accordingly the scope should be determined not by the embodiments illustrated, but by the claims and their legal equivalents.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope.

What is claimed is:

1. A method of tracking frequencies of transmitted burst signals, the method comprising:
   receiving a burst signal;
   determining a quality of the burst signal and a carrier frequency of the burst signal;
   determining a carrier frequency of the burst signal including:
      conditioning the burst signal;
      determining two peak frequencies of the conditioned burst signal; and
      when the two peak frequencies are separated by a predetermined amount and are within the drift window, the carrier frequency is determined to be derived from a point midway between the two peak frequencies;
   demodulating the burst signal based upon the determined carrier frequency;

determining a frequency offset of the burst signal based on the determined carrier frequency; and when the quality of the burst signal exceeds a threshold, calculating a drift window based on the determined frequency offset.

2. The method of claim 1, wherein the burst signal is a complex time signal, and conditioning the burst signal comprises:
squaring the complex time signal at least one time; and
converting the complex time signal from a time domain to a frequency domain.

3. The method of claim 1, further comprising:
determining a predetermined amount of time has elapsed before receiving the burst signal; and
when the predetermined amount of time has elapsed, setting carrier frequency scan ranges of the burst signal to their defaults.

4. The method of claim 1, wherein the quality of the burst signal is determined before demodulation of the burst signal.

5. The method of claim 1, wherein the quality of the burst signal is determined after demodulation of the burst signal.

6. The method of claim 1, wherein when the determined carrier frequency of the burst signal is not within a carrier range, further comprising using a previously calculated carrier frequency resulting from a valid signal burst as the determined carrier frequency.

7. A method of tracking frequencies of transmitted burst signals the method comprising:
receiving a burst signal;
determining a carrier frequency of the burst signal by:
conditioning the burst signal;
determining two peak frequencies of the conditioned burst signal; and
when the two peak frequencies are separated by a predetermined amount and are within the drift window, the carrier frequency is determined to be derived from a point midway between the two peak frequencies;
demodulating the burst signal based upon the determined carrier frequency;
determining a frequency offset of the burst signal based on the determined carrier frequency; and
calculating a drift window based on the determined frequency offset.

8. The method of claim 7, wherein the burst signal is a complex time signal, and conditioning the burst signal comprises:
squaring the complex time signal at least one time; and
converting the complex time signal from a time domain to a frequency domain.

9. The method of claim 7, wherein determining the carrier frequency of the burst signal comprises:
conditioning the burst signal;
determining a peak frequency of the conditioned burst signal; and
when the peak frequency exceeds other frequencies by a predetermined amount, the peak frequency is determined to be a valid representation of the carrier frequency.

10. The method of claim 7, further comprising:
determining a predetermined amount of time has elapsed before receiving the burst signal; and
when the predetermined amount of time has elapsed, setting carrier frequency scan ranges of the burst signal to their defaults.

11. A wireless communication device configured to track frequencies of transmitted burst signals, the wireless communication device comprising:
a transceiver configured to receive a burst signal; and
processing circuitry including a memory and a processor, the memory in communication with the processor, the memory having instructions that, when executed by the processor, configure the processor to:
determine a quality of the burst signal and a carrier frequency of the burst signal by:
conditioning the burst signal;
determining two peak frequencies of the conditioned burst signal; and
when the two peak frequencies are separated by a predetermined amount and are within the drift window, the carrier frequency is determined to be derived from a point midway between the two peak frequencies;
demodulate the burst signal based upon the determined carrier frequency;
determine a frequency offset of the burst signal based on the determined carrier frequency; and
when the quality of the burst signal exceeds a threshold, calculate a drift window based on the determined frequency offset.

12. The wireless communication device of claim 11, wherein the burst signal is a complex time signal, and conditioning the burst signal comprises:
squaring the complex time signal at least one time; and
converting the complex time signal from a time domain to a frequency domain.

13. The wireless communication device of claim 11, wherein the processor is further configured to:
determine a predetermined amount of time has elapsed before receiving the burst signal; and
when the predetermined amount of time has elapsed, set the carrier frequency of the burst signal to a default frequency.

14. The wireless communication device of claim 11, wherein the quality of the burst signal is determined before demodulation of the burst signal.

15. The wireless communication device of claim 11, wherein the quality of the burst signal is determined after demodulation of the burst signal.

16. The wireless communication device of claim 11, wherein the burst signal is a complex time signal, and conditioning the burst signal comprises:
squaring the complex time signal at least one time; and
converting the complex time signal from a time domain to a frequency domain, wherein converting the complex time signal from a time domain to a frequency domain is performed by Fast Fourier Transform (FFT) and the quality of the burst signal is based on a quality of the FFT.

17. The wireless communication device of claim 11, wherein when the determined carrier frequency of the burst signal is not within a carrier range, the processor is further configured to use a previously calculated carrier frequency resulting from a valid signal burst as the determined carrier frequency.

* * * * *